United States Patent

Levin et al.

[11] Patent Number: 6,122,247
[45] Date of Patent: Sep. 19, 2000

[54] METHOD FOR REALLOCATING DATA IN A DISCRETE MULTI-TONE COMMUNICATION SYSTEM

[75] Inventors: Howard E. Levin, Austin; Nicole D. Teitler, Pflugerville, both of Tex.

[73] Assignee: Motorola Inc., Schaumburg, Ill.

[21] Appl. No.: 08/976,472

[22] Filed: Nov. 24, 1997

[51] Int. Cl.[7] .............................. H04J 11/00; H04L 27/28
[52] U.S. Cl. ........................... 370/210; 370/484; 375/260
[58] Field of Search ..................................... 370/480, 482, 370/484, 203, 210, 252, 204, 205, 209; 375/260, 224, 225, 227

[56] References Cited

U.S. PATENT DOCUMENTS

| | | | |
|---|---|---|---|
| 5,400,322 | 3/1995 | Hunt et al. | 370/19 |
| 5,479,447 | 12/1995 | Chow et al. | 375/260 |
| 5,533,008 | 7/1996 | Grube et al. | 348/13 |
| 5,596,604 | 1/1997 | Cioffi et al. | 345/260 |
| 5,790,550 | 8/1998 | Peeters et al. | 370/480 |
| 5,822,374 | 10/1998 | Levin | 375/260 |
| 5,852,633 | 12/1998 | Levin et al. | 375/260 |
| 5,867,528 | 2/1999 | Verbueken | 375/260 |

FOREIGN PATENT DOCUMENTS

| | | | |
|---|---|---|---|
| 0 753 948 A1 | 1/1997 | European Pat. Off. | H04L 5/06 |
| 0 812 087 A2 | 12/1997 | European Pat. Off. | H04L 27/26 |
| 2 303 032 | 2/1997 | United Kingdom | H04L 5/06 |

OTHER PUBLICATIONS

Communication, 1 pg.
European Search Report, 2 pgs.
Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.
U.S. application No. 08/660,380, Levin et al., filed Jun. 6, 1996.
U.S. application No. 08/660,399, Levin, filed Jun. 7, 1996.
U.S. application No. 08/741,634, Johnson et al., filed Nov. 4, 1996.
U.S. application No. 08/744,078, Johnson et al., filed Nov. 4, 1996.
U.S. application No. 08/741,635, Johnson et al., filed Nov. 4, 1996.
U.S. application No. 08/937,759, Levin, filed Sep. 25, 1997.

*Primary Examiner*—Chau Nguyen
*Assistant Examiner*—Soon-Dong Hyun

[57] ABSTRACT

In the present invention, an ADSL system (10) determines if a bit swap is to occur based upon a projected margin of a best carrier and a current margin of a worst carrier. If a proposed swap is not beneficial (320, 512, 604, 612) no swap occurs. In addition, the present invention determines the effects of a bit swap on an error correction scheme (510, 611). If the swap effects the scheme, adjustments to system parameters are made to assure continued error correction. In addition, the present invention allows for bit swapping to and from bins containing zero or two bits respectively (331, 332, 403).

32 Claims, 5 Drawing Sheets

| SNR TABLE | |
|---|---|
| BITS | SNR$_{REF}$ |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

300

METHOD FOR REALLOCATING DATA IN A DISCRETE MULTI-TONE COMMUNICATION SYSTEM

CROSS-REFERENCE TO RELATED APPLICATIONS

A related application entitled "Method and Apparatus for Configuring a Communication System," by Levin, and having application Ser. No. 08/937,759, has been previously filed.

FIELD OF THE INVENTION

This invention relates generally to a communication system and more specifically to a method for reallocating data between carriers of a discrete multi-tone communication system.

BACKGROUND OF THE INVENTION

In order to make high data rate interactive services such as video conferencing and internet access available to more residential and small business customers, high speed data communication paths are required. Although fiber optic cable is the preferred transmission media for such high data rate services, it is not readily available in existing communications networks, and the expense of installing fiber optic cable is prohibitive. Current telephone wiring connections, which consist of twisted pair media, were not designed to support the high data rates required for interactive services such as video on demand or even high speed interconnects. In response, Asymmetrical Digital Subscriber Line (ADSL) technology has been developed to increase the transmission capabilities within the fixed bandwidth of existing twisted pair connections, allowing interactive services to be provided without requiring the installation of new fiber optic cable.

Discrete Multi-Tone (DMT) is a multi-carrier ADSL technique that divides the available bandwidth of a communications channel such as a twisted pair connection into a number of frequency sub-channels. These sub-channels are also referred to as frequency bins or carriers. The DMT technique has been adopted by the ANSI T1E1.4 (ADSL) committee for use in ADSL systems. In ADSL, DMT is used to generate 250 separate 4.3125 kHz sub-channels from 260 kHz to 1.1 MHz for downstream transmission to the end user, and 26 sub-channels from 26 kHz to 138 kHz for upstream transmission by the end user. Each bin is allocated a number of bits to send with each transmission. The number of bits allocated to an ADSL system are 0, and 2–15 bits.

Prior to transmitting real-time data with an ADSL system, an initialization process occurs. During a first portion of the initialization process, an activation and acknowledgment step occurs. It is during this step that a transmit activation tone is generated following power-up of the ADSL system. Transceiver training is the next step of the initialization process. During transceiver training, the equalization filters of the ADSL system are trained and system synchronization is achieved. Next, channel analysis and exchange are performed as part of the initialization processes. During the channel analysis and exchange, the signal to noise ratio of the channels is determined, and bit loading configurations of the bins and other configuration information are transferred.

Subsequent to the initialization process, real-time data transmission begins. During real-time data transmission, the characteristics associated with the transmission media can change resulting in a varying bit error rate (BER). Two factors that can affect the transmission media characteristics would include temperature changes and a variable noise source. For example, a transmission media can be heated by direct exposure to sunlight, or by mechanical heating generally during start-up when the ADSL transceiver has not reached a steady state operating temperature before the end of the initialization process. An example of a variable noise source would include an adjacent service, such as additional ADSL line cards, which cause interference within the same frequency spectrum.

Changes in transmission media characteristics can affect the overall performance of the ADSL system by affecting the BER of individual carriers. The use of bit swapping has been proposed to maintain system performance when a change in system environment has affected individual carriers. In the prior art, the mean-squared error (MSE) associated with individual bins has been monitored by the receiving portions of the ADSL systems. The MSE represents the error at the decoder of a transmitted data constellation. The MSE, however, is linked only to the constellation for the current number of bits.

The SNR required to successfully transmit data at a specific BER is based on the constellation scheme. Current DMT encoding schemes are not uniform for different size bit allocations, for example, as shown in FIG. 2, i.e. the increase in SNR required to get from a two to three bit transmission is not the same as the SNR increase required to get from a three bit to four bit transmission. With substantially different SNR intervals, judgments based solely on MSE will result in bad swaps in some situations.

Therefore, the bin with the lowest MSE may not be the best candidate to receive a bit. As a result, in the prior art, always swapping from the bin with the highest MSE to the bin with the lowest MSE can result in a lower system performance. In order to address this, the prior art has set a threshold value that must exist between the best and worst case MSE bins that is high enough so that the lowest MSE bin is much better than the highest MSE before a swap occurs. This way, it is guaranteed that the swap will be beneficial. However, a large threshold means that the system performance must be greatly diminished before a beneficial swap can occur. As a result, the prior art system performance is not optimal. In addition, the proposed bit swapping methods of the prior art are not capable of performing bit swapping between bins having zero or two bits associated with them. Therefore, an efficient method of performing bit swapping in a DMT system would be beneficial. Another problem associated with the prior art bit swapping method is that no provisions are provided for bit swapping where Error Correction techniques are used.

DETAILED DESCRIPTION OF THE DRAWINGS

Figure 1:
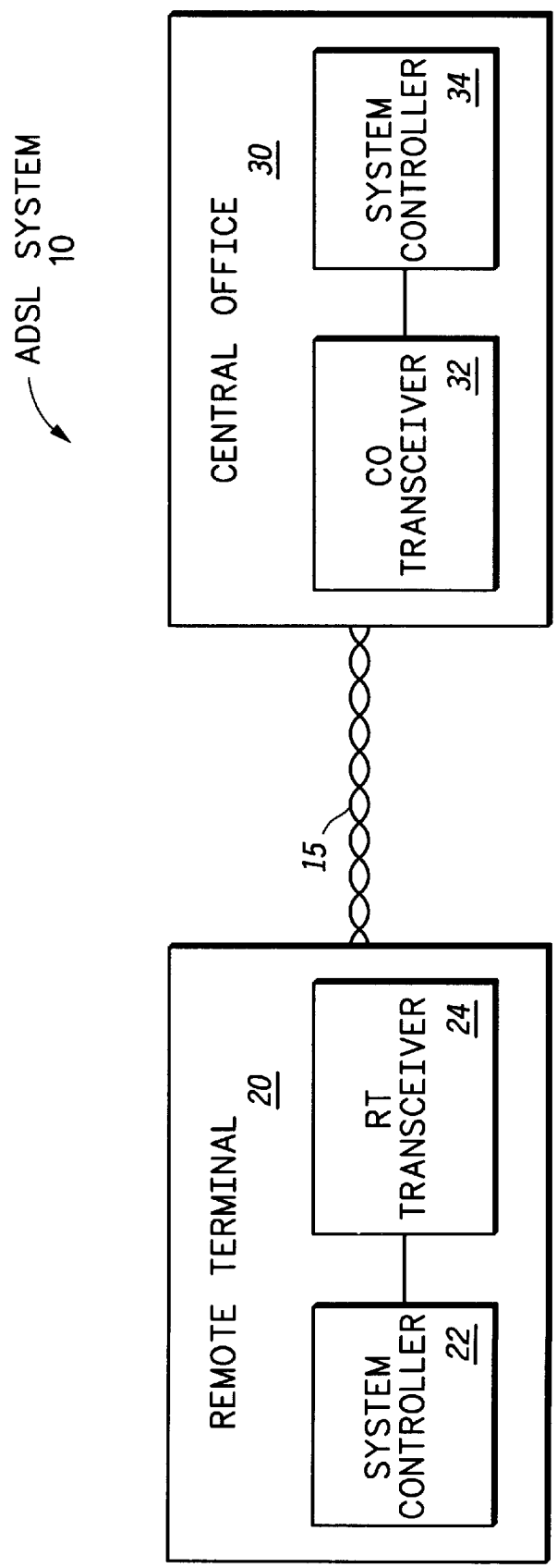
FIG. 1 illustrates, in block form, an ADSL system.

FIG. 1 illustrates an ADSL system 10. The ADSL system 10 comprises a remote terminal 20, and a central office 30 connected by a twisted pair transmission media 15. The remote terminal 20 and central office 30 each comprise a system controller 22 and 34 respectively. In addition, the remote terminal 20 and central office 30 each comprise a transceiver 24 and 32 respectively. The ADSL system 10 is capable of implementing the present invention. In operation, the central office 30 transmits downstream data across the transmission media 15 to the remote terminal 20. The data is received at the remote terminal 20 by the transceiver 24, which provides the received data to the system controller 22 for further processing. The system controller can use either software, firmware, or hardware to process the received data. In a likewise fashion, the upstream data would be transmitted from the remote terminal 20, across the transmission media 15, and received by the central office transceiver 32, which provide the data to the system controller 34.

Figures 2, 4:
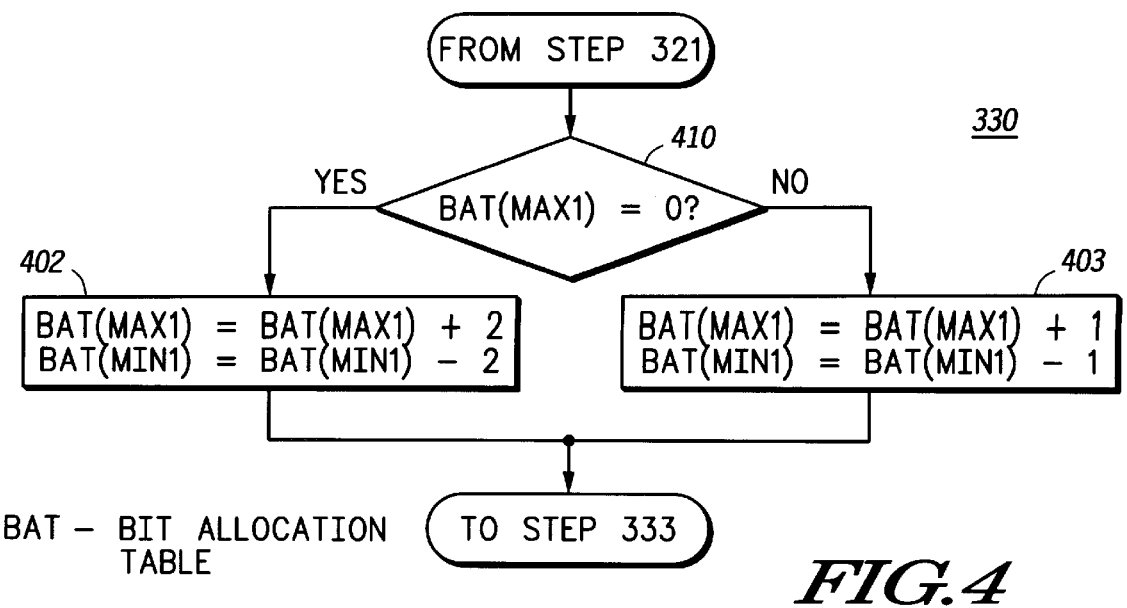
FIG. 2. illustrates an SNR reference table.
FIGS. 3–6 illustrate, in flow diagram form, a method of performing bit swapping.

FIG. 2 illustrates an SNR reference table for use within the ADSL system 10. The SNR reference table indicates an SNRref value, which is the SNR needed for a bin to transmit a specified number of bits at a specific bit error rate (BER). For example, a bin which is determined to have an SNR of 32 would be able to transmit 7 bits of data according to the table in FIG. 2. Also, for a specific bit error rate, the values of SNR reference table will vary depending upon the type of error correction used, if any. For example, the use of error correction could reduce each SNRref value in FIG. 2 by three. Likewise, for a BER greater than that of the table of FIG. 2, note that a specific BER is not specified for the table of FIG. 2, each SNRref value would be decreased. This reduction would allow a bin having an SNR of 32 to transmit 8 bits.

FIGS. 3–6 illustrate a method for implementing the present invention. At step 310, an initialization step occurs. It is during this initialization step that the activation and acknowledgment, transceiver training, channel analysis, and exchange functions occur. Subsequent to the initialization process 310 transmission of real-time data begins.

At step 311, the ADSL system 10 monitors the SNR values of the carriers. By monitoring the SNR values of the carriers it can be determined whether or not characteristics of the ADSL system have changed to effect the data capacity or bit error rate of the ADSL system 10. Next, at step 312, the current margin is determined for each bin. One method for determining the current margin for an individual bin is determined by the equation: $SNR(i)-SNRref(NUMi)$, where $SNR(i)$ is the SNR value from step 311 for a specific bin (i), NUMi is the number of bits allocated to bin (i), and SNRref(NUMi) is the SNRref value from the SNR table for the number of bits NUMi. This equation provides a current margin (CM) which is indicative of the quality of the channel. For example, a bin having a current margin of 7 would have a better error rate associated with it than a bin having a current margin of 4.

Next, at step 313, a projected margin (PM) is determined for each bin. In one embodiment of the invention, the PM for each bin is calculated by taking the SNR value from step 311 for each bin and subtracting off the SNRref value for a projected number of bits as determined by the equation: $SNR(i)-SNRref(NUMi+inc)$. Note that the value of (inc) is an incremental amount where inc is the smallest number of bits that the current bin (i) can be incremented. Since the ANSI T1E1 spec does not allow one bit to be allocated to a bin, the incremental amount (inc) will be two for a bin having zero bits allocated to it, while the incremental amount will be one for a bin having two to 14 bits allocated to it, and zero for bins having 15 bits allocated to it.

For example, if a bin has zero bits allocated to it, the projected margin is based on an incremental allocation of two bits. Therefore, the projected margin would be the bin's SNR minus the SNRref value for two bits. Referring to FIG. 2, the SNRref for two bits is 14, therefore the PM would be the SNR of the bin minus 14. If a bin currently has a total of six bits allocated to it, the next projected number of allocated bits would be 7 bits for an allocation increase of one bit. Therefore, a bin having 6 bits currently allocated would have a projected signal to noise margin of: SNR-30. Note that the initial SNR for each individual bin is assumed to have been previously determined during the initialization step 310 and updated by step 311.

Next, at step 314, for a given transmitting direction, upstream or downstream, it is determined which bins have the maximum projected margin and which bins have the minimum current margin. For example, when the downstream bins are being considered, MAX1 would be the downstream bin having the largest projected margin of all of the downstream bins, and MAX2 would represent the bin having the second largest projected margin of the downstream bins. These bins represent the best bins to receive additional bit allocation. It should be noted, however, where the projected margin of a single bin is large relative to all other bins, it is possible for the MAX1 bin and the MAX2 bin to be the same bin. At step 314, bins that have 15 bits allocated to them are removed from MAX bin consideration, since they are not candidates for additional allocation.

Conversely, at step 314, the MIN1 bin would be the bin having the smallest current margin, while the MIN2 bin would be the bin having the next smallest current margin. These represent the best bins, to have bits deallocated from them. As with the MAX bins, it would be possible for both bin MIN1 and BIN MIN2 to be the same bin. For purposes of discussions, the specific embodiment of the present invention is discussed with reference to a downstream transmission. One skilled in the art will recognize that the present invention is equally applicable to upstream transmissions. At step 314, bins that have zero bits are removed from being considered a MIN BIN because no bits can be deallocated from a bin having zero bits.

At step 320, a determination is made whether or not the projected margin of the MAX1 bin is greater than the current margin of the MIN1 bin plus some threshold value. If the threshold value is set to zero, step 320 determines whether a bit swap between bins MAX1 and MIN1 will improve performance of the system. Since it would be possible to have an improvement which is so small as to not warrant the processing time associated with a swap, a threshold value can be used to specify a minimum improvement level. The present invention allows for a small threshold value to be used, unlike the prior art. When it is determined at step 320 that the proposed bit swap is not worthwhile, no swap occurs, and flow continues to step 333 where the fine gains of the system can be adjusted, and from step 333 subsequently to step 311, where SNR values of the carriers are continued to be monitored. When it is determined that a bit swap is potentially beneficial, the flow proceeds from step 320 to step 321.

At step 321, it is determined whether the number of used bins will remain the same following a potential swap. It should be noted, however, that the swap can still be cancelled later in the flow. A bin is defined as a "used" bin if it transmits data during a transmission. If the bin has zero bits allocated to it, it is defined as an "unused" bin. Generally, a bit allocation table (BAT) is used to store bin loading information. The use of a BAT is indicated in the flows where BAT(MIN1) would represent the number of bits allocated to bin MIN1. If the number of used bins following a swap remains the same, it is considered a simple swap, and the flow proceeds to step 330 which is labeled CASE A and further with reference to FIG. 4. A simple swap occurs when either a single bit is swapped between two bins, or when two bits are swapped between two bins. A simple swap between two bins occurs when the number of bits allocated to bin MAX1 is equal to zero and the number of bits allocated to bin MIN1 is equal to 2, or when the number of bits allocated to bin MAX1 is greater than zero and the number of bits allocated to bin MIN1 is greater than 2.

If the condition of step 321 is not met, then a simple swap is not occurring, and the flow proceeds to step 322. At step 322, the number of bins needed for the swap will likely cause a change in the number of used bins. This occurs because an unused bin has been identified as MAX1 or a used bin having two bits allocated to it has been identified as MIN1. Unused bins must be allocated two bits because ANSI specification does not allow one bit allocations. Therefore, unless the MIN1 bin has exactly two bits, a situation which is now precluded given step 321, the MIN1 and MIN2 bin must be used to deallocate the second bit needed by bin MAX1. Likewise, two bits must be deallocated from bins having two bits. Therefore, if bin MIN1 has exactly 2 bits to deallocate, the MAX1 and MAX2 bins will be needed at step 322.

At step 322, a determination is made whether or not the number of bits associated with the MAX1 bin is equal to zero. If the number of bits associated with the MAX1 bin is equal to zero, a total of two bits will be needed, one from bin MIN1 and one from bin MIN2, and the flow proceeds to case B of step 331 which is illustrated in further detail in FIG. 5. If the number of bits associated with the MAX1 bin is not equal to zero, one bit needs to be allocated to each of bin MAX1 and MAX2, and the flow proceeds to case C of step 332 which is illustrated further in FIG. 6. Following the return from cases A, B, and C, the flow proceeds at step 333 where fine gain changes can be implemented as discussed later.

Figure 3:
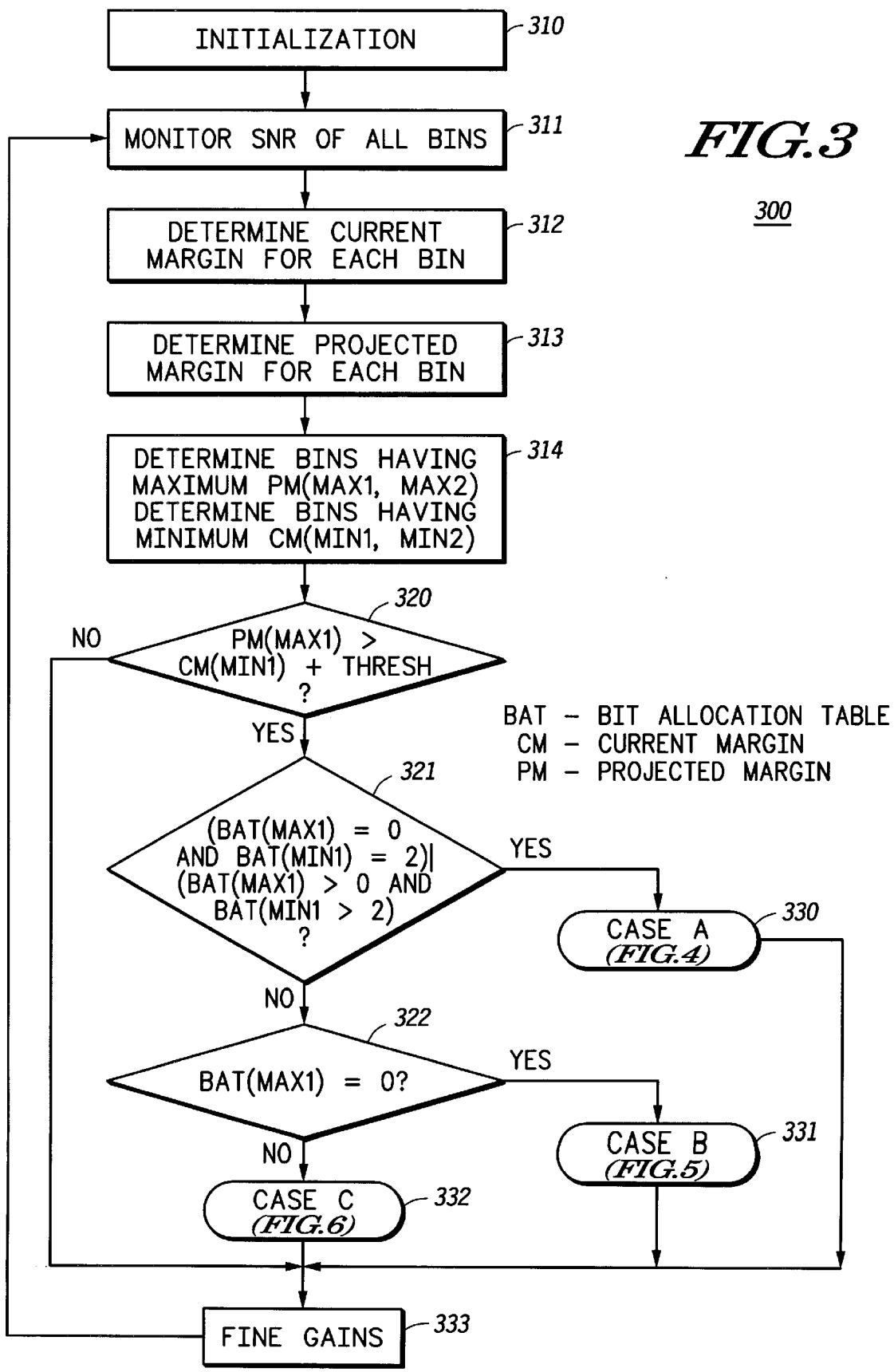

FIG. 4 illustrates in greater detail the simple swap of Case A 330 from FIG. 3. At step 410, a determination is made whether or not there are zero bits allocated to bin MAX1. If bin MAX1 does not have zero bits associated with it, then it is possible for a single bit to be added to the bin MAX1, as indicated in step 403. At step 403 the capacity of the bin MAX1 is incremented by 1, while the bit capacity of the bin MIN1 in the bit allocation table is decremented by one. Therefore, when it is determined at step 410 that bin MAX1 does not equal zero, a single bit is swapped, or reallocated, between bins MAX1 and MIN1. Returning to step 410, if the determination is made that the number of bits in the bin MAX1 is equal to zero, it is then known that two bits must be swapped between bins MAX1 and MAX2, and the flow proceeds to step 402. At step 402 the bit loading associated with bin MAX1 in the bit allocation table is incremented by two while the bit loading associated with the bin MIN1 in the bit allocation table is decremented by two. Next, flow from both steps 402 and 403 proceeds to step 333 of FIG. 3.

Figure 5:
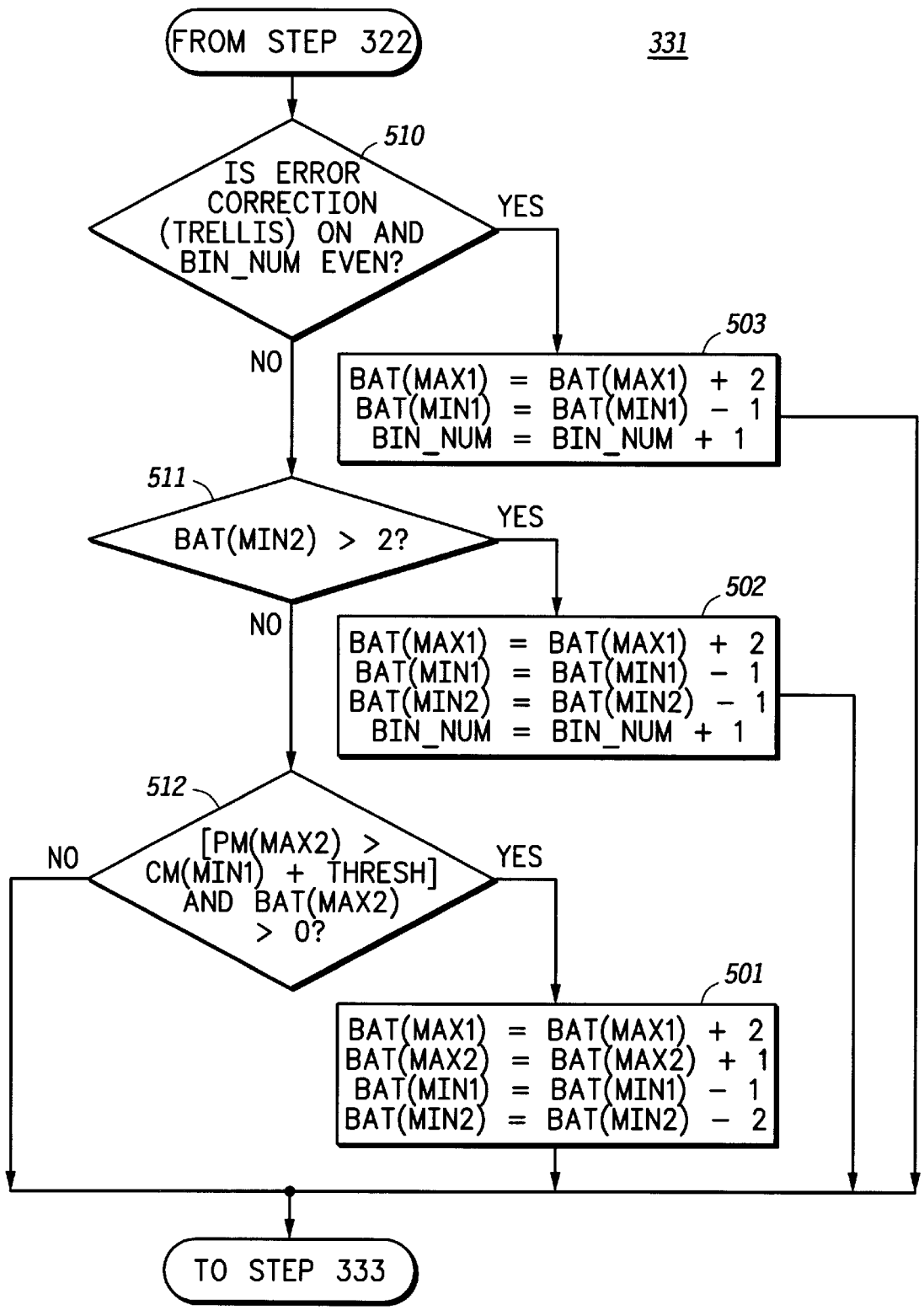

FIG. 5 illustrates in greater detail Case B 331 from FIG. 3. At step 510, a determination is made whether or not error correcting, such as Trellis encoding, is being used. When Trellis encoding is being used as the error correction method, for our embodiment of Trellis encoding it is necessary to determine whether there is an even number of used bins. When error correction is used and any specific criteria associated with the error correction is met, such as put forth above, the flow of FIG. 5 proceeds to step 503. At step 503, assuming WEI 4D Trellis error correction, the data allocation associated with bin MAX1 is incremented by 2 while the bit allocation associated with bin MIN1 is decremented by 1. The bin MAX1 is incremented once for the allocation bit being swapped from bin MIN1, and once more to account for an additional error correction bit used by the Trellis encoder algorithm. Note, other implementations of Trellis may have different error correction bit requirements. Next, a counter which indicates the total number of bins being used, BIN_NUM, is incremented by 1. The total number of used bins is tracked to support Trellis encoding which in one implementation requires for every 2 bins used an additional overhead bit is allocated. Because MAX1 was previously unused it was not previously reflected in the count of BIN_NUM.

Returning to step 510, if error correction is not used or, as with Trellis encoding, some other criteria is not met, flow proceeds to step 511. At step 511, a determination is made whether or not there are more than 2 bits allocated to bin MIN2. In the event more than 2 bits of data are allocated to bit MIN2, the flow proceeds to step 502. At step 502, the allocation of bin MAX1 is incremented by 2. As previously discussed, it is necessary to increment bin MAX1 by 2 because bin MAX1 was previously unused and a minimum of 2 bits must be allocated to an unused bin. In addition, BIN_NUM, is incremented by 1 in order to account for the bin MAX1 which was previously unused. Next, bin MIN1 and bin MIN2 are both decremented by 1 bit. By decrementing bin MIN1 and MIN2, the total number of bits allocated to all bins remains the same. Next from step 502, the flow proceeds to step 333 of FIG. 3.

Returning to step 511, if it is determined at step 511 that the bin MIN2 is not greater than two, the flow proceeds to step 512. Note that the possibility of allocation of zero bits to bin MIN2 was eliminated at step 314. Therefore, at step 512, MIN2 allocation is equal to two. Once the flow has proceeded to step 512, any swap that occurs will require an allocation of a data bit to bin MAX2. Step 512 determines whether the bin MAX2 can have data added to it without adversely affecting the overall system performance. This is done by comparing the projected margin of bin MAX2 to the current margin of bin MIN1 and determining whether or not it is greater than the current margin of MIN1 plus some threshold value. In addition, at step 512, a determination is made whether or not the allocation of bin MAX2 is greater than zero. If the allocation to bin MAX2 is equal to zero, two bits would need to be allocated to bin MAX2, and only one bit is available, therefore, no swap can occur, and flow proceeds directly to step 333. Likewise, if it is determined that it is not advantageous to perform the swap, the flow from step 512 also proceeds directly to step 333 of FIG. 3.

However, when the bit loading of bin MAX2 is greater than zero and the swap is determined to be advantageous, the flow proceeds to step 501. At step 501, the allocation of data to bin MAX1 is incremented by 2. Bin MIN1's allocation is decremented by 1. If no further swaps were to occur, there would be a situation where on extra bit has been allocated. This extra bit is decremented from bin MIN2, however, because at step 501 there are exactly two bits allocated to bin MIN2, it is not possible to decrement a single bit from bin MIN2. Therefore, 2 bits are subtracted from bin MIN2, resulting in one extra bit being deallocated. As illustrated in FIG. 5, this bit is allocated to bin MAX2. The overall effect is that a total of 3 bits have been swapped in order to improve the performance of the ADSL system 10. Following step 501 the flow proceeds to step 333 of FIG. 3.

Figure 6:
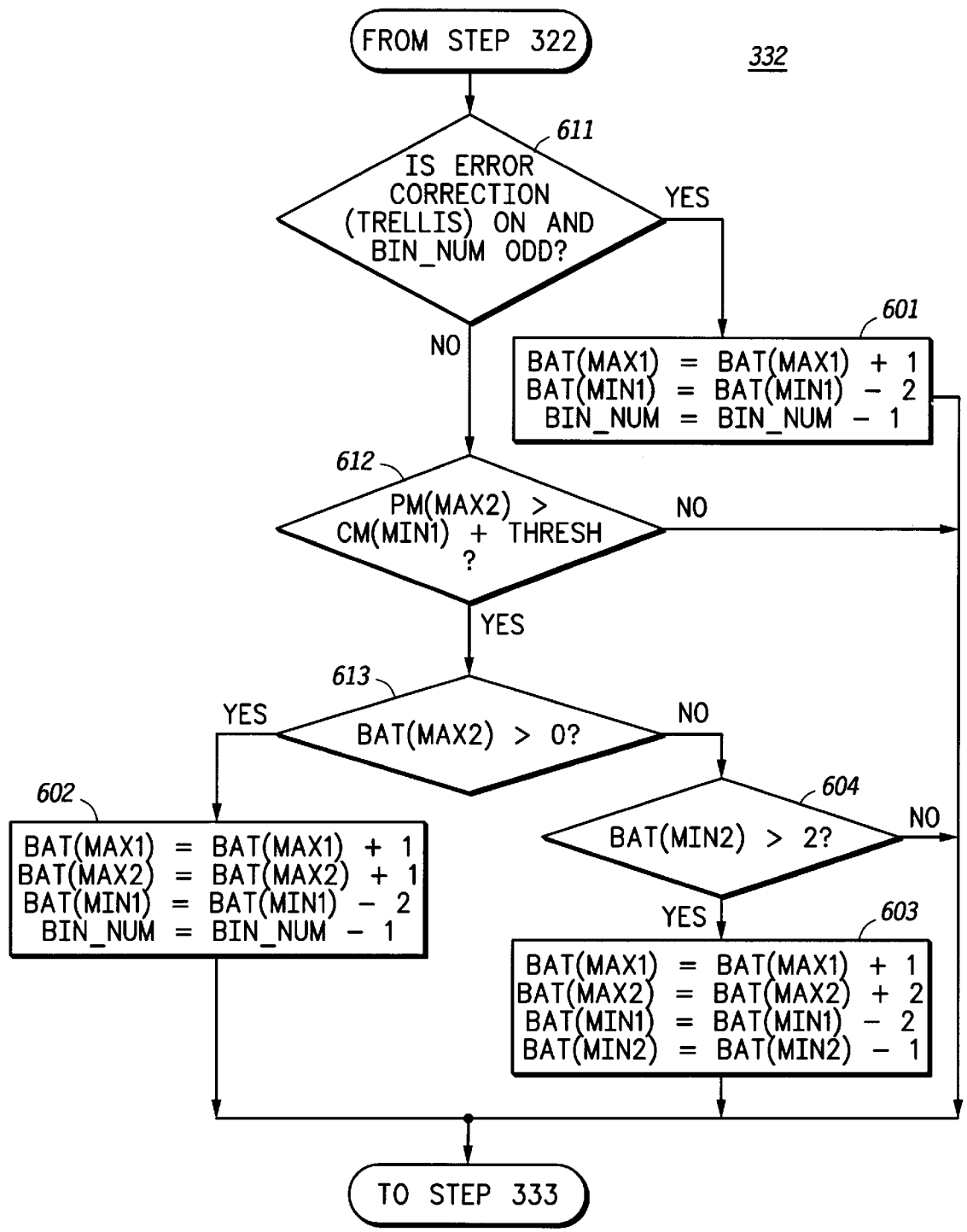

FIG. 6 illustrates in greater detail Case C 332 from FIG. 3. At step 611, a determination is made whether or not error correction, such as Trellis encoding, is turned on. When Trellis encoding is used as the error correction method, it is also necessary to determine whether there is an odd number of used bins in the channel. If the error correction conditions of step 611 are true, flow proceeds to step 601. At step 601, the bit allocation associated with bin MAX1 is incremented by 1, while the bit allocation associated with bin MIN1 is decremented by 2. The bit allocation of bin MIN1 is decremented once because of the bit swap, and a second time because a Trellis bit is no longer a needed. The Trellis bit is no longer needed because the number of used bins is going from an odd number of bins to an even number of bins. In order to record the change in the number of bins, the bin count, BIN_NUM is decremented by one. Following step 601, flow proceeds to step 333 of FIG. 3.

If at step 611, error correction is not used, or other error correction criteria are not met, flow proceeds to step 612. At step 612, a determination is made whether the projected margin of bin MAX2 (PM(MAX2)) is greater than the current margin of bin MIN1 (CM(MIN1)) plus some threshold value. The determination of step 612 is performed in order to determine whether or not a bit swapped into bin MAX2 will result in an overall optimization worth pursuing. If the optimization is not worth pursuing, because the swap would cause a degradation or insignificant change in performance, the flow proceeds to step 333 of FIG. 3. However, if at 612 it is determined that the bit swap would be desirable improved performance, flow proceeds to step 613.

At step 613, a determination is made whether or not the bin MAX2 is currently used. If bin MAX2 is used, flow proceeds to step 602. At step 602, the bin MIN1 allocation is decremented by 2 bits and one additional bit is allocated to both bins MAX1 and MAX2. Thereby, the single bin MIN1 has had 2 bits swapped to the bins MAX1 and MAX2. Also, BIN_NUM is decremented by one to reflect one fewer bins being used. Following step 602, the flow proceeds to step 333 of FIG. 3.

Returning to step 613, flow proceeds to step 604 if it is determined that the current bit allocation to bin MAX2 is equal to zero. At step 604 it is determined whether bin MIN2 allocation is greater than 2. If bin MIN2 is not greater than two, it is not possible for a single bit to be decremented from bin MIN2 and the flow proceeds to step 333 without a swap occurring. If at step 604, it is determined that the bin MIN2 allocation is greater than two, flow proceeds to step 603. At step 603 a bit swap occurs between the bins MIN1, MIN2, MAX1, and MAX2. This occurs by decrementing the bit allocations of bins MIN1 and MIN2 by two and one bits respectively, and incrementing the bit allocation to bins MAX1 and MAX2 by one and two bits respectively. In effect, a total of 3 bits have been swapped at step 603 allowing for effective handling of the bit swapping adjustments. Flow from step 603 proceeds to step 333 of FIG. 3.

Returning to step 333 of FIG. 3, a fine gain adjustments is made to the ADSL system as necessary. The ADSL specification allows a total of 6 message fields per frame. For a single bit swap, which includes one increment and one decrement, two message fields are required. Therefore, if a single bit is swapped, four fields remain for adjusting the fine gains of the bins. Similarly, if no bits are swapped or two bits are swapped, 6 or 2 message fields are available for fine gain messages. The present invention allows for any bin in the channel, not just the bins associated with a swap, to have its gain adjusted when there are extra fields available. Any fine gain adjustment algorithm can be used to determine the actual bin to be adjusted, and the amount of the gain. This is an advantage over the prior art which did not take advantage of the extra message bandwidth associated with bit swapping.

The present invention provides advantages over the prior art. For example, it is possible to perform bit swapping to unused bins, and from bins having exactly two allocated bits, without the prior art disadvantage of using a large threshold value. Next, the present invention allows for proper handling of error correction during the swap process. In addition, the present invention allows any bin to have its gain modified when there is extra message bandwidth available without requiring additional bandwidth.

In the foregoing specification, the invention has been described with reference to specific embodiments. However, one of ordinary skill in the art appreciates that various modifications and changes can be made without departing from the scope of the present invention as set forth in the claims below. For example, the specific embodiment has been discussed in terms of the downstream channel, one skilled in the art would appreciate that the invention is equally applicable to transmission in the upstream channel. Similarly, the present invention is described with reference to one or two bits being swapped, other implementations could swap more bits. In addition, other error correction algorithms can be considered, included other versions of Trellis encoding. For example, at steps 510 and 611, instead of a MOD (2) function being performed, a MOD (N) function could be used. The actual implementation of the present invention could be accomplished in firmware, software, or hardware. Accordingly, the specification and figures are to be regarded in an illustrative rather than a restrictive sense, and all such modifications are intended to be included within the scope of present invention.

We claim:

1. A method for dynamically reallocating data in a discrete multi-tone communication system having a plurality of bins for sending data, the method comprising the steps of:

determining a signal-to-noise value for each of the plurality of bins;

defining a current reference signal-to-noise value;

defining a projected reference signal-to-noise value;

calculating a current signal-to-noise margin for each of the plurality of bins based on the signal-to-noise value and the current reference signal-to-noise value;

calculating a projected signal-to-noise margin for each of the plurality of bins based on the signal-to-noise value and the projected reference signal-to-noise value;

identifying a first portion of the plurality of bins which have a maximum projected signal-to-noise margin;

identifying a second portion of the plurality of bins which have a minimum current signal-to-noise margin; and dynamically determining a first number of bits to be reallocated from the second portion of bins to the first portion of bins.

2. The method of claim 1, wherein the step of dynamically determining further comprises:

dynamically determining the first number of bits from a set comprising zero, one, two, and three.

3. The method of claim 2, further comprising the step of:

providing a fine gain adjustment value if the first number is not three.

4. The method of claim 1, further comprising the step of:

storing the current reference signal-to-noise value and the projected reference signal-to-noise value in a table in a memory.

5. The method of claim 1, further comprising the step of:

allocating an error correction bit to at least one of the plurality of bins.

6. The method of claim 1, further comprising the steps of:
    identifying a best bin within the first portion of the plurality of bins; and
    identifying a worst bin within the second portion of the plurality of bins.

7. The method of claim 6, further comprising the step of:
    determining if a projected signal-to-noise margin of the best bin is greater than a sum of a current signal-to-noise margin of the worst bin plus a first threshold value.

8. The method of claim 7, wherein the first threshold value is non-zero.

9. The method of claim 6, wherein said step of dynamically reallocating comprises the steps of:
    dynamically reallocating the first number of bits from the worst bin to the best bin if a current number of bits allocated to the best bin is zero and a current number of bits allocated to the worst bin is two; and
    dynamically reallocating the first number of bits from the worst bin to the best bin if the current number of bits allocated to the best bin is greater than zero and the current number of bits allocated to the worst bin is greater than two.

10. The method of claim 9, wherein if the current number of bits allocated to the best bin is zero, then the first number of bits is two.

11. The method of claim 9, wherein said step of dynamically reallocating further comprises the steps of:
    if the current number of bits allocated to the best bin is greater than zero, then the first number of bits is one.

12. The method of claim 6, further comprising the steps of:
    determining if a current number of bits allocated to the best bin is zero.

13. The method of claim 12, wherein said step of dynamically reallocating comprises the steps of:
    if a predetermined number of used bins are used, dynamically allocating a new error correction bit to the best bin.

14. The method of claim 13, wherein the step of dynamically allocating if a predetermined number of bins are used further includes dynamically allocating when Trellis error is used.

15. The method of claim 13, wherein said step of dynamically allocating comprises the step of:
    if a predetermined number of bins are not used, identifying a second worst bin within the second portion of the plurality of bins.

16. The method of claim 15, wherein said step of dynamically reallocating comprises the steps of:
    determining if a current number of bits allocated to the second worst bin is greater than two.

17. The method of claim 16, wherein said step of dynamically reallocating further comprises the steps of:
    deallocating one bit from the worst bin;
    deallocating one bit from the second worst bin; and
    allocating two bits to the best bin.

18. The method of claim 16, further comprising the steps of:
    determining if a projected signal-to-noise margin of a second best bin is greater than a sum of a current signal-to-noise margin of the worst bin plus a second threshold value; and
    determining if the current number of bits allocated to the second best bin is greater than zero.

19. The method of claim 18, wherein the second threshold value is non-zero.

20. The method of claim 18, wherein the second threshold value is zero.

21. The method of claim 18, wherein said step of dynamically reallocating further comprises the steps of:
    deallocating one bit from the worst bin;
    deallocating two bits from the second worst bin;
    allocating two bits to the best bin; and
    allocating one bit to the second best bin.

22. The method of claim 12, wherein said step of dynamically reallocating comprises the steps of:
    if error correction is being used and a number of used bins is odd, dynamically reallocating one bit from the worst bin to the best bin, and deallocating an error correction bit from the worst bin.

23. The method of claim 22, wherein the error correction is Trellis error correction.

24. The method of claim 22, wherein said step of dynamically reallocating comprises the step of:
    if error correction is not used or the number of used bins is even, identifying a second best bin within the first portion of the plurality of bins.

25. The method of claim 16, further comprising the steps of:
    determining if a projected signal-to-noise margin of a second best bin is greater than a sum of a current signal-to-noise margin of the worst bin plus a second threshold value.

26. The method of claim 25, wherein the second threshold value is non-zero.

27. The method of claim 25, wherein the second threshold value is zero.

28. The method of claim 25, further comprising the steps of:
    determining if the current number of bits allocated to the second best bin is greater than zero.

29. The method of claim 25, wherein said step of dynamically reallocating comprises the steps of:
    determining if a current number of bits allocated to the second worst bin is greater than two.

30. The method of claim 29, wherein said step of dynamically reallocating further comprises the steps of:
    deallocating two bits from the worst bin;
    deallocating one bit from the second worst bin;
    allocating one bit to the best bin; and
    allocating two bits to the second best bin.

31. The method of claim 29, wherein said step of dynamically reallocating further comprises the steps of:
    deallocating two bits from the worst bin;
    allocating one bit to the best bin; and
    allocating one bit to the second best bin.

32. A method for dynamically reallocating data in a discrete multi-tone communication system having a plurality of bins for sending data, the method comprising the steps of:
    determining a signal-to-noise value for each of the plurality of bins;
    storing a plurality of reference signal-to-noise values;
    defining a current reference signal-to-noise value for each of the plurality of bins by selecting one of said plurality of reference signal-to-noise values for each of the plurality of bins, wherein the current reference signal-to-noise value for each of the plurality of bins is determined by a number of bits currently allocated to a corresponding one of the plurality of bins;

defining a projected reference signal-to-noise value for each of the plurality of bins by selecting one of said plurality of reference signal-to-noise values for each of the plurality of bins, wherein the projected reference signal-to-noise value for each of the plurality of bins is determined by a number of bits projected to be allocated to the corresponding one of the plurality of bins;

calculating a signal-to-noise margin for each of the plurality of bins based on the signal-to-noise value and the current reference signal-to-noise value;

calculating a projected signal-to-noise margin for each of the plurality of bins based on the signal-to-noise value and the projected reference signal-to-noise value;

identifying a first best bin within the plurality of bins, the first best bin having a maximum projected signal-to-noise margin;

identifying a second best bin within the plurality of bins, the second best bin having a next maximum projected signal-to-noise margin;

identifying a first worst bin within the plurality of bins, the first worst bin having a minimum current signal-to-noise margin;

identifying a second worst bin within the plurality of bins, the second worst bin having a next minimum current signal-to-noise margin; and dynamically reallocating a first number of bits from at least one of the first and second best bins to at least one of the first and second worst bins based on bit loading.

* * * * *